March 10, 1970  W. A. HESKE  3,500,391
ROTATIONAL DISPLAY COUNTER
Filed May 1, 1968
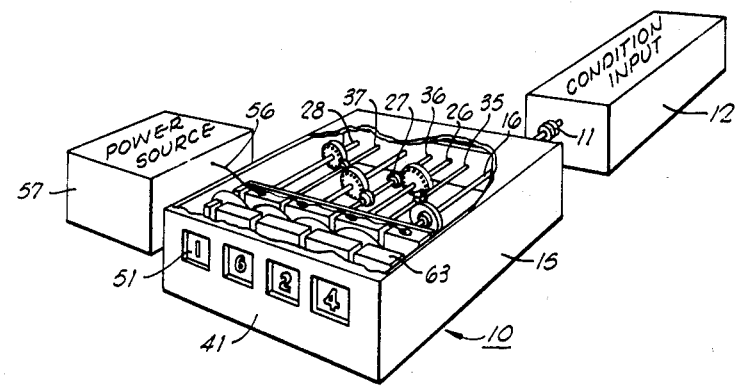
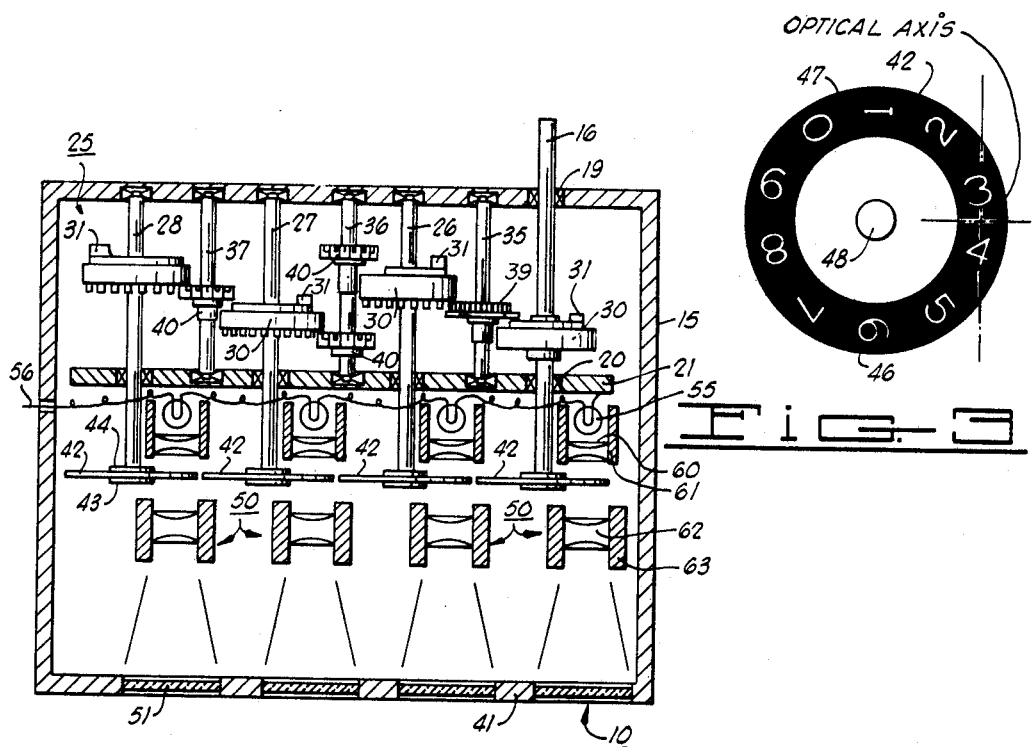
INVENTOR.
WILLIAM A. HESKE
BY
ATTORNEY

United States Patent Office 3,500,391
Patented Mar. 10, 1970

3,500,391
ROTATIONAL DISPLAY COUNTER
William A. Heske, Fairfield, Conn., assignor to Dresser Industries, Inc., Dallas, Tex., a corporation of Delaware
Continuation-in-part of application Ser. No. 565,857, July 18, 1966. This application May 1, 1968, Ser. No. 725,690
Int. Cl. G08b 5/02; G06m 1/22
U.S. Cl. 340—378                5 Claims

ABSTRACT OF THE DISCLOSURE

A rotational counter providing illuminated digital display of analogue input data being measured. A mechanically transduced analogue output of a remote data measuring device is operably connected to an input drive of the counter which translates the input to a correlated optically projected exterior display of digital or other alphanumeric characters.

CROSS-REFERENCES TO RELATED APPLICATIONS

This application is a continuation-in-part of application Ser. No. 565,857, now abandoned, filed July 18, 1966, entitled "Condition Responsive Apparatus."

BACKGROUND OF THE INVENTION (1) The field of art to which the invention pertains includes the art of rotation counters as contained in Patent Office class 235 "Registers."

(2) The use of rotation counters for visual display of measured analogue input information is well known and are widely marketed. In the usual application for these counters, they are constructed as integral parts of the measuring unit for which the data is to be displayed. The visual form of the numerically displayed information is usually of a digital character on a contrasting background for reflective viewing. Where illumination is necessary to ensure readout under unfavorable light conditions, it is common to employ an incandescent lamp or the like adjacent the character wheel and which can be energized as needed. However, within the vast complexities of industry, the data measuring unit is frequently located at a generally obscure inaccessible site under highly adverse light conditions. Readout must frequently be made at a distance and for which these prior type counter displays have not been entirely suitable. Either the characters in these prior devices lack sufficient clarity at a distance or where constructed of a sufficiently large size, the unit is rendered unnecessarily massive and economically disadvantageous.

SUMMARY

This invention relates to a rotational counter display unit adapted for mechanical coupling to a variety of measuring devices having mechanical output drives. The unit is highly compact as to be clearly portable and yet provides a display of information substantially more vivid under adverse light conditions as to render it increasingly more suitable for these purposes than such comparable prior art devices. In accordance herewith, this result is achieved by optically projecting count indicating information onto a ground glass surface for visual display exterior of the unit casing.

It is therefore an object of the invention to provide a novel rotational counter display unit.

It is a further object of the invention to provide a novel counter display unit having increased readout clarity under adverse light conditions.

It is a still further object of the invention to provide a novel rotational counter as in the aforesaid objects which is portable, compact and suitable for coupling to a variety of input measuring devices.

BRIEF DESCRIPTIONS OF THE DRAWINGS

FIG. 1 is an isometric view partially broken away illustrating the device hereof;

FIG. 2 is a plan sectional view of the internal operating components; and

FIG. 3 is an elevation view of the character object source.

Referring now to the drawings, there is shown the display counter unit 10 in accordance herewith connected via a coupling 11 to a condition input device 12 supplying measured data output information. The condition input device may for example comprise a conditioned responsive device of the type disclosed in the parent application hereof.

The entire counter display unit is contained in an enclosed casing 15 generally rectangular in shape and in an actual embodiment is compacted to condensed physical dimensions of about 5 x 2 x 3½ inches. Input to the unit is received via input counter shaft 16 extending outward of the casing through wall 17 for conjoint rotation with the output shaft of condition input device 12. Shaft 16 as well as additional counter shafts 26, 27 and 28 are part of a counter drive mechanism designated 25 and are journalled for rotation between their journal supports 19 in the rear wall and journal supports 20 in intermediate support wall 21. Shaft 16 represents the "1" counter shaft while shafts 26, 27 and 28 represents the "10," "100," and "1,000" counter units respectively.

Also, forming part of the counter drive mechanism secured at intermediate locations on each of the counter shafts is a pinion 30 having a Geneva drive pin 31 axially extending from its face. It will be noted that each of the aforementioned counter shafts extend in parallel alignment to each other while the respective pinions thereon are transversely staggered or skewed to effect maximum compactness. Axially intermediate each of the unit counter shafts are rotationally journalled idler shafts 35, 36 and 37 the former of which includes a Geneva wheel 39 secured thereon while the latter shafts support at least one multilated pinion 40 secured thereon. Intermediate shaft 36 includes a tandem arrangement of pinions 40 to provide a transverse restepping whereby the pinion wheels on shafts 16 and 27 are in general transverse alignment. As shaft 16 is rotated, each of the pinions 30 and 40 via intermediate Geneva wheel 39 transmit a unit counter by the successive step mesh count engagement therebetween.

As a digital character source, there is provided an annular character disc 42 secured at the extreme or terminal end of each counter shaft at a location between intermediate wall 21 and casing front wall 41. Each disc is rotatably secured on its respective shaft through it central aperture 48 via tight-fit central washers 43 and 44. The disc, as can be seen in FIG. 3, includes clockwise extending radially concentric numerals 46 which in a prefered embodiment are transparent to light surrounded by an opaque background 47. Preferably, disc 42 is formed photographically or by another well known reproduction process in which the disc is a photographic negative on a stable, self supporting base such as acrylic plastic.

For readout of disc characters, there is included with each counter shaft an optical system 50 to project a number digit 46 appropriately placed at the optical axis onto a screen 51 in the form of ground glass set in the casing front wall 41. The optical axis extends axially parallel to its respective counter shaft with which it is associated at a distance corresponding to the radial center of the numeric circle on the disc face. Comprising each optical system is a minature bulb 55 of the type producing about 0.35 candle power energized via lead 56 from a suitable on-site power source 57. Adjacent each of the lamps contained within a mount 61 is a condenser lens 60 the emitted light from which is impressed on the disc 42 as the object source. The light passing through the optical object is projected via a short focal length lens 62 contained within its lens mount 63 onto its corresponding screen 51. When employing a lens 62 of approximately 5 mm. focal length, a numeric object size on disc 42 of about $5/32$ inch produces sharp vivid image size on screen 51 of approximately $5/8$ to $3/4$ inch.

By the above description, there is disclosed a novel rotational display counter which is highly compact, easily portable and produces a highly vivid contrast for easy readout under even most difficult adverse lighting conditions including complete darkness. Not only are the visual characteristics improved by virtue of the optical contrast, but by appropriate selection of optical components, desired magnification can be effected to any practical ratio. Where preferable to produce the projected image in any selected color, appropriate color filters can be employed.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A rotational display counter comprising in combination:
   (a) a casing;
   (b) a plurality of counter shafts mounted for rotation in parallel alignment within said casing, one of said shafts being adapted for operably receiving an output drive from a measuring source to be counted;
   (c) counter drive pinions on said counter shafts operably engaging each other in counter drive relation;
   (d) an annular disc secured to each of said counter shafts having display characters radially arranged about its face;
   (e) optical means defining an optical axis extending normal with respect to a predetermined location of the character path on each of said disc faces for optically projecting characters therefrom; and
   (f) an optical surface supported at said casing to receive the image characters projected by said optical means for visual viewing exterior of said casing.

2. The apparatus according to claim 1 in which the characters on said disc are digital figures defined by transparent areas surrounded by opaque areas thereon.

3. The appartus according to claim 2 in which said drive pinions are arranged transversely staggered with respect to adjacent ones thereof.

4. The apparatus according to claim 3 in which said one shaft extends outward of said casing for coupling connection to an output drive shaft of a measuring source.

5. The apparatus according to claim 4 in which said optical surface comprises a section of ground glass individually aligned in each optical axis at the conjugate image distance thereof.

References Cited

UNITED STATES PATENTS

| | | | |
|---|---|---|---|
| 2,730,303 | 1/1956 | Hajos | 235—136 |
| 2,945,624 | 7/1960 | Nicolaus | 235—92 |
| 3,376,782 | 4/1968 | Whitley et al. | 353—25 |
| 3,402,490 | 9/1968 | Goldman et al. | 340—378 |
| 3,441,928 | 4/1969 | Hatch | 340—378 |

STEPHEN J. TOMSKY, Primary Examiner

U.S. Cl. X.R.

235—103